United States Patent
Crescimanno et al.

(10) Patent No.: US 9,499,679 B2
(45) Date of Patent: Nov. 22, 2016

(54) CURABLE FORMALDEHYDE FREE COMPOSITIONS AS BINDERS HAVING SOLVENT RESISTANCE

(71) Applicant: Rohm and Haas Company, Philadelphia, PA (US)

(72) Inventors: Stephen A. Crescimanno, Hatfield, PA (US); Michael D. Kelly, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 382 days.

(21) Appl. No.: 14/035,115

(22) Filed: Sep. 24, 2013

(65) Prior Publication Data
US 2014/0094560 A1 Apr. 3, 2014

Related U.S. Application Data

(60) Provisional application No. 61/706,940, filed on Sep. 28, 2012, provisional application No. 61/814,991, filed on Apr. 23, 2013.

(51) Int. Cl.
| | | |
|---|---|---|
| *C08K 3/20* | (2006.01) | |
| *C08F 290/12* | (2006.01) | |
| *C08K 5/17* | (2006.01) | |
| *D04H 1/587* | (2012.01) | |
| *D04H 1/64* | (2012.01) | |

(52) U.S. Cl.
CPC ............. *C08K 3/20* (2013.01); *C08F 290/126* (2013.01); *C08K 5/17* (2013.01); *D04H 1/587* (2013.01); *D04H 1/64* (2013.01)

(58) Field of Classification Search
CPC .......... C08K 3/20; C08K 5/17; D04H 1/587; D04H 1/64; C08F 290/126
See application file for complete search history.

(56) References Cited

U.S. PATENT DOCUMENTS

| | | | | |
|---|---|---|---|---|
| 4,710,525 A * | 12/1987 | Kraemer | ............... | C08F 291/00 436/531 |
| 4,876,313 A | 10/1989 | Lorah | | |
| 5,306,744 A * | 4/1994 | Wolfersberger | ...... | C08F 265/06 522/149 |
| 5,714,539 A | 2/1998 | Perez et al. | | |
| 6,043,169 A | 3/2000 | Jaffee | | |
| 6,174,953 B1 | 1/2001 | Huybrechts | | |
| 6,262,159 B1 | 7/2001 | Dreher et al. | | |
| 2008/0214716 A1 | 9/2008 | Weiss et al. | | |
| 2009/0143528 A1* | 6/2009 | Mestach | ............... | C08F 265/02 524/832 |
| 2009/0156078 A1 | 6/2009 | Connaughton et al. | | |
| 2009/0156080 A1 | 6/2009 | Finch et al. | | |
| 2009/0252962 A1* | 10/2009 | Michl | ................... | C03C 25/285 428/375 |
| 2012/0190263 A1 | 7/2012 | Hager | | |
| 2015/0329661 A1* | 11/2015 | Crescimanno | ........ | C08F 265/02 524/555 |

FOREIGN PATENT DOCUMENTS

WO 9534703 A1 12/1995

* cited by examiner

*Primary Examiner* — Peter D Mulcahy
(74) *Attorney, Agent, or Firm* — Andrew E. C. Merriam

(57) ABSTRACT

The present invention provides aqueous binder compositions comprising one or more polyol and a multistage copolymer, preferably, an all acrylic and allylic or all acrylic copolymer, having as the outermost stage a polymerized acid functional aqueous solution polymer and as the one or more remaining stage(s) a vinyl emulsion polymer, wherein the emulsion polymer stage(s) in the multistage copolymer comprises 5 wt. % or less of hydrophilic monomer, based on the total weight of monomers used to make the emulsion polymer stage(s). The multistage copolymer enables incorporation of a much higher amount of hydrophilic monomer into a polymeric binder without the attendant handling or viscosity problems. Also provided are methods of using the aqueous binder compositions comprising pultruding two or more non-woven fibers or a fiber roving with the aqueous binder composition, and drying. Articles comprising the bound fiber(s) are provided.

10 Claims, No Drawings

CURABLE FORMALDEHYDE FREE COMPOSITIONS AS BINDERS HAVING SOLVENT RESISTANCE

The present invention relates to thermosetting formaldehyde free binders comprising multistage aqueous emulsion copolymers. More particularly, it relates to binders comprising copolymers having two or more stages (multistage copolymers) in which the outermost stage is an acid functional aqueous solution polymer and one or more inner stage is an emulsion polymer and comprising one or more polyol for crosslinking for use, for example, in the pultrusion of nonwoven glass fiber mat substrates to provide high tensile strength, as well as to the methods of using the same.

In a pultrusion process a resin reinforced or impregnated mat is pulled through a die. In pultrusion, mats and veils can tear, crease, or wrinkle at or prior to entering the performer or forming/curing die resulting in costly and time consuming line stoppages or delays so tear resistance is critical to success. In pultrusion, the mats or surfacing veils usually employ as resins known thermosetting, formaldehyde free styrene acrylic binder resins and styrene monomers, used as a thinner for the binder resins. All contact with styrene, polystyrene can weaken the mat. The binder can lose strength when in contact with the styrene monomer. In addition to its use as a resin binder thinner, polystyrene may be used in a later coating for surface smoothness or to prepare for painting.

U.S. patent publication no. 2009/0156078A, to Connaughton, et al., discloses aqueous acid functional emulsion copolymer binders having a glass transition temperature (Tg) of from −45° to 25° C. In the emulsion copolymers of this patent disclosure, the acid functional groups and the comonomers are a single copolymer stage and the acid component, based on the total weight of monomers used to make the emulsion copolymer amount to no more than 25 wt. % of any polymer stage or segment. Such binders may not exhibit ideal crosslinking with a polyol because the acid functional groups in the emulsion copolymer may remain in the hydrophobic phase of the copolymer during use, thereby making them unavailable for crosslinking. This may possibly impair mat product tensile strength.

The present inventors have endeavored to solve the problem of providing a formaldehyde free binder solution that increases solvent resistance in use, including resistance to styrene, and reduces nonwoven mat or veil tearing, creasing, or wrinkling in use.

STATEMENT OF THE INVENTION

In accordance with the present invention, aqueous binders comprise copolymers in two or more stages (multistage copolymers) having as the outermost stage a polymerized acid functional, preferably, carboxyl or carboxylate functional, aqueous solution polymer and as the one or more remaining stages a vinyl emulsion polymer, the vinyl emulsion polymer preferably being all-acrylic, and one or more polyol. The emulsion polymer stage(s) in the multistage copolymer comprise 5 wt. % or less, preferably, 3 wt. % or less, or, more preferably, 1 wt. % or less, of hydrophilic monomer, such as acrylic acid or acrylamide, based on the total weight of monomers used to make such vinyl emulsion polymer stage(s).

In the aqueous binder of the present invention, the ratio of hydroxyl group equivalents in the polyol to acid functional group equivalents, e.g., carboxyl groups, in the multistage copolymer may range from 0.125:1 to 10.0:1, or, preferably, from 0.25:1 to 5.0:1, or, more preferably, 2.0:1 or less, or, preferably, 0.5:1 or more.

The aqueous solution polymer in the multistage copolymer of the present invention comprises a total of from 70 to 100 wt. % or more hydrophilic monomers that contain a hydrophilic functional group, in copolymerized form, or, preferably, 80 wt. % or more, such as acrylamide or hydroxyalkyl acrylates, based on the total weight of monomers used to make the solution polymer, such that the aqueous solution polymer comprises from 30 to 100 wt. %, or, preferably, 45 wt. % or more, or, more preferably, 60 wt. % or more, or, even more preferably, 70 wt. % or more, of acid, carboxylic acid or carboxylate functional hydrophilic monomers, in (co)polymerized form, based on the total weight of monomers used to make the solution polymer. Preferably, the acid functional monomers used to make the solution polymer are acrylic acid, methacrylic acid, itaconic acid, or their salts.

The solution polymer stage in the multistage copolymer of the present invention may comprise from 5 to 75 wt. % of the multistage copolymer, expressed as the weight percent of weight of monomers, in copolymerized form, that are used to make the multistage copolymer, preferably, 15 to 65 wt. %, more preferably, 20 wt. % to 63 wt. %.

In the multistage copolymer of the present invention, the weight ratio of the solution polymer stage(s) to the total vinyl emulsion polymer stage(s) may range from 1:19 to 3:1, or, preferably, from 1:4 to 7:3.

The vinyl emulsion polymer stages of the multistage copolymer may include up to 20 wt. % of styrene, in copolymerized form, based on the total weight of monomers used to make the emulsion copolymer stage(s) of the multistage copolymer, preferably, 10 wt. % or less.

Preferably, for solvent resistant binders, the one or more vinyl emulsion polymer stages of the multistage copolymer comprise from 0.1 to 100 wt. %, or, preferably, 10 to 30 wt. %, of acrylonitrile, in copolymerized form, based on the total weight of monomers used to make the vinyl emulsion polymer stage(s) of the multistage copolymer.

The polyol in the aqueous binder composition of the present invention preferably has a molecular weight of 1000 or less, and is preferably a trihydric polyol, such as glycerol, or an alkanolamine, such as triethanolamine or diethanolamine. For example, glycerol has a molecular weight of 92.

The aqueous binder composition of the present invention may further comprise a catalyst such as a phosphorus acid catalyst, preferably, a hypophosphorous acid or its salt.

The aqueous binder of the present invention is substantially formaldehyde free and is, preferably, formaldehyde free.

In another aspect of the present invention, methods of using the aqueous binder compositions comprise pultruding two or more non-woven fibers or a fiber roving with the aqueous binder compositions of the present invention, and drying, preferably, with heating.

In yet another aspect of the present invention, products comprise nonwoven fiber articles treated with the binder compositions of the present invention, such as, for example, pultruded fibers or nonwoven fiber mats, such as gypsum board facing sheets or portions thereof, chopped and continuous strand mats, and fibers for reinforcing plastics, such as in sheet molding compounds or fiber reinforced composites. The fibers or mats may comprise glass, polyester, metal or any other fiber used to make non-woven mats. Pultruded fibers are preferably glass or stone wool and may, in addition, include reinforcing fibers such as mineral fibers, carbon fibers, ceramic fibers, natural fibers, and/or synthetic fibers in the chopped strand glass mat. The term "natural fiber" refers to plant fibers extracted from any part of a plant, including the stem, seeds, leaves, roots, or phloem. Examples of natural fibers for reinforcing include basalt, cotton, jute, bamboo, ramie, bagasse, hemp, coir, linen, kenaf, sisal, flax, henequen, and combinations thereof.

All ranges recited are inclusive and combinable. For example, a proportion of from 30 to 100 wt. %, or, preferably, 45 wt. % or more, or, more preferably, 60 wt. % or more, or, even more preferably, 70 wt. % or more, will include ranges of 30 wt. % to 100 wt. %, from 30 wt. % to 45 wt. %, from 30 wt. % to 60 wt. %, from 45 wt. % to 60 wt. %, from 60 wt. % to 100 wt. %, from 45 to 100 wt. %, from 30 to 70 wt. %, from 45 to 70 wt. %, from 60 to 70 wt. % and from 70 to 100 wt. %.

Unless otherwise indicated, all pressure units are standard pressure and all temperature units refer to room temperature.

All phrases comprising parenthesis denote either or both of the included parenthetical matter and its absence. For example, the phrase "(co)polymer" includes, in the alternative, polymer, copolymer and mixtures thereof. Also, the term "(meth)acrylate" means acrylate, methacrylate, and mixtures thereof and the term "(meth)acrylic" used herein means acrylic, methacrylic, and mixtures thereof.

As used herein, the term "acrylic" (co)polymer refers to polymers comprising the polymerization product of acrylate and/or methacrylate monomers or their acids or amides.

As used herein, the phrase "aqueous" includes water and mixtures comprising water and less than 50 wt. % of one or more water-miscible solvent.

As used herein, the phrase "based on the total weight of binder solids" refers to weight amounts of any given ingredient in comparison to the total weight amount of all the non-water ingredients in the binder (e.g., polyacids, emulsion copolymers, polyols and the like). Binders of the present invention can be aqueous or dry (with water optionally added prior to application to a substrate).

As used herein, unless otherwise indicated, the word "copolymer" includes, independently, copolymers, terpolymers, block copolymers, segmented copolymers, graft copolymers, and any mixture or combination thereof. (Co)polymer means homopolymer or copolymer.

As used herein, the term "formaldehyde free" means that the composition contains less than 500 ppm formaldehyde or, preferably, 100 ppm or less, or that the composition does not liberate more than 500 ppm formaldehyde as a result of drying or curing, or, preferably, 100 ppm or less. Preferably, it means compositions that comprise less than one part per million by weight of formaldehyde.

As used herein, the term "hydrophilic monomer" means a monomer having an affinity for water and capable of interacting with water through hydrogen bonding, which monomer is water soluble (at least 50 wt. % at room temperature) and its homopolymer has a water solubility of at least 20 wt. % at both room temperature and at 50° C. for a homopolymer of 5000 $MW_w$.

As used herein, the term "measured Tg" refers to the glass transition temperature of a sample (co)polymer as measured by differential scanning calorimetry per ASTM 3418/82 (1982), at a heating rate of 20° C./minute, taking the midpoint of the temperature plateau on the scan, with cell calibration performed using an indium reference for temperature and enthalpy.

As used herein, unless otherwise indicated, the phrase "molecular weight" or the term "average molecular weight" when referring to a polymer refers to the weight average molecular weight ($MW_w$) of a polymer as measured by gel permeation chromatography (GPC). Gel permeation chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

As used herein, the term "multistage" refers to a polymer having two or more stages.

As used herein, the term "wt. %" means weight percent.

The aqueous binders of the present invention enable the incorporation of a higher available acid functionality than has been attained previously in an emulsion copolymer binder; thus, the present invention enables one to provide high tensile strength fibers or fiber mats having increased solvent resistance. The resistance to solvents, such as styrene, allows for faster line speeds and fewer product defects in fibers, rovings, mats and veils formed in accordance with the present invention. Further, the mat or veil products bound with the aqueous binder of the present invention can be treated or painted with polystyrene or styrene copolymers without a loss of strength. And, because it can be made at a wide variety of hardness levels for the emulsion polymer stage(s), the multistage copolymer of the present invention can be useful in applications that demand flexibility or useful in applications for more rigid polymers or binders.

The multistage copolymer of the present invention can be formed via a conventional aqueous polymerization method, or via polymerization in the presence of a relay reagent which has a free radical polymerizable olefin group, a coreactive functional group which reacts with the hydrophilic functional group of the aqueous solution polymer stage such that greater than 30 wt. % of the relay reagent, based on the total amount of relay reagent used to make the multistage copolymer forms a reaction product with the aqueous solution polymer stage in an aqueous medium, and a molecular fragment separating the olefin group and the coreactive functional group. The molecular fragment may have 1-30 atoms comprising carbon and/or silicon and excluding hydrogen, or, preferably, 3 to 20 atoms comprising carbon and/or silicon and excluding hydrogen or, more preferably, 4-15 atoms comprising carbon and/or silicon and excluding hydrogen. As used in connection with the molecular fragment of the relay reagent of the present invention, the term "comprising" allows for other atoms such as O, N, S, etc. in the molecular fragment.

The multistage copolymer of the present invention represents a copolymerization product which is not a uniform molecule product; rather, it represents a distribution of copolymers having a range of molecular weights, compositions and morphologies.

The multistage copolymerization product also varies in composition within the limits of the present invention. At least 30 wt. %, preferably, 50 wt. % or more, of the solution polymer stage and the vinyl emulsion polymer stage(s) of the multistage copolymer are covalently bound in the multistage copolymer of the present invention. However, the multistage copolymer in the copolymerization product of the present invention may contain a proportion of solution polymer in the aqueous phase that is not covalently bound to the vinyl emulsion polymer stage(s) in the disperse phase of the multistage copolymer. The proportion of solution polymers not covalently bound to one emulsion polymer stage may preferably be controlled as described below by selecting for the solution polymer up to 20 wt. %, based on the total weight of monomers used to make the solution polymer, of a comonomer that is not a hydrophilic monomer, as defined above, by selecting a preferred relay reagent, by selecting, in the monomer mix used to form the vinyl emulsion polymer, a monomer which is itself soluble (≥50 wt. %) in water but which does not form a water soluble polymer (≥20 wt. % in water).

In all cases, the solution polymer is formed first by polymerizing all or nearly all of the hydrophilic monomers and any comonomers, preferably, in the presence of a water soluble chain transfer agent, such as hypophosphite or its salt. In the relay reagent method, the solution polymer is reacted with the relay reagent in an aqueous medium, preferably, one having less than 10 wt. %, preferably less than 5 wt. %, of a water miscible solvent, based on the weight of the aqueous medium, to form a modified aqueous solution polymer containing at least one pendant olefin. Then through emulsion polymerization of vinyl and/or acrylic monomers under conventional free radical polymerization conditions, the acid functional solution polymer is then covalently attached to the vinyl emulsion polymer. If desired, additional vinyl emulsion polymer stages may then be copolymerized into the multistage copolymer.

Preferably, in making the solution polymer, the monomers are fed into the reaction by gradual addition, however a shot polymerization method may be used so long as sufficient chain transfer agent is included to limit molecular weight and encourage copolymer formation, for example, from 2 to 10 wt. %, based on the total weight of monomers used to make the solution polymer stage.

Because the aqueous solution polymer acts as a dispersing agent, little or no surfactant is needed in polymerization. Up to a total of 0.4 wt. % or, preferably, up to 0.3 wt. % of anionic and/or cationic surfactants may be included; or up to a total of 1 wt. % or, preferably, up to 0.25 wt. % of nonionic surfactants may be included.

Aqueous solution polymer solids in the polymerization may range from 25 to 75 wt. %, or, preferably, 30 to 60 wt. %, based on the total weight of the reaction mixture.

Polymerization temperatures may range from 25° C. to 100° C., preferably, from 70° C. to 100° C., especially when a phosphorus containing chain transfer agent is used. Cooler temperatures may be used when sulfur or nitrogen containing chain transfer agents are used.

In the multistage copolymer of the present invention, the solution polymer stage can be a homopolymer or a copolymer. Preferably, when the solution polymer is a copolymer, it is formed from 20 wt. % or less, most preferably, from 0.5 to 15 wt. %, of total comonomer that is not a hydrophilic monomer, based on the total weight of monomers used to make the solution polymer. Comonomers that are not hydrophilic may provide water resistance and improve grafting or covalent bonding yield to the other stage(s) of the emulsion copolymer. Useful comonomers may be those used in the emulsion polymer stage(s) of the multistage emulsion copolymer, e.g. alkyl acrylates and methacrylates.

Relay reagents suitable for use in the present invention are dual functional compounds having a free radical polymerizable olefin and a functional group coreactive with the acid functional solution polymers, particularly in an aqueous medium. Examples of relay reagents may include compounds having a $C_1$-$C_{20}$ hydrocarbon group as a molecular fragment separating the olefin and coreactive functional group. Relay reagents suitable for making multistage copolymers comprising acid functional solution polymers include those having epoxy, oxazoline and azetidinium functional groups. Examples of suitable relay reagents include allyl glycidyl ether, the reaction product of an allyl acetoacetonate or allyl cyanoacetates with glycidyl methacrylate, oxazoline functional olefins such as allyloxybenzyl oxazoline or isopropenyl oxazoline, crotonic esters such as glycidyl crotonate or the monoadduct reaction product of crotonic acid with a diepoxide (for example, resorcinol diglycidyl ether and bisphenol A diglycidyl ether) containing a single epoxide.

The proportion of solution polymer covalently bound to an emulsion polymer stage may be controlled by proper selection of the relay reagent. Preferred relay reagents react preferentially with solution polymer in water to form a macromonomer and do not homopolymerize in the solution phase during subsequent emulsion polymerization steps. Further, preferred relay reagents improve the affinity of the solution polymer for the surface of the emulsion polymer. Such relay reagents have molecular fragments between olefin and coreactive functional groups of at least 3 carbon and/or silicon atoms, excluding hydrogen, or, more preferably, at least 4 carbon and/or silicon atoms, excluding hydrogen. More preferably, the relay reagent comprises an allyl or crotonic ester group.

The relay reagent may be used in amounts ranging from 0.1 to 10 wt. %, or, preferably, from 0.2 to 5 wt. %, based on the total weight of monomers used to make the solution polymer.

Hydrophilic monomers suitable for use in making the solution polymer of the present invention are those whose homopolymer is water soluble (defined as having a water solubility of at least 20 wt. % at both room temperature and at 50° C. for a homopolymer of 5000 $MW_w$). Some examples of hydrophilic monomers are (meth)acrylic acid (AA or MAA), acrylamide, hydroxyethyl acrylate, acrylamido methylpropane sulfonic acid (AMPS), phosphorus acid containing monomers, such as, for example, phosphoethyl methacrylate (PEM), and methacryloxyethyl trimethylammonium chloride (MAPTAC).

Each stage, and preferably all stages, of the vinyl emulsion polymer of the multistage copolymer of the present invention may be polymerized from any suitable ethylenically unsaturated monomer, such as vinylic, allylic, styrenic or acrylic monomers, such as acrylic ester monomers, e.g. any of one or more $C_1$ to $C_{20}$ alkyl or $C_5$ to $C_{20}$ cycloalkyl or $C_5$ to $C_{20}$ aryl(meth)acrylates or (meth)acrylonitrile in the presence of the solution polymer stage. Preferably, the vinyl emulsion polymer stage(s) are all acrylic and allylic or all acrylic.

Suitable acrylic ester monomers include, for example, methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; methacrylamide or substituted (meth)acrylamides; styrene or substituted styrenes; butadiene; vinyl acetate or other vinyl esters; acrylonitrile or methacrylonitrile; and the like.

Low levels of multi-ethylenically-unsaturated monomers can be used in order to produce low levels of pre-crosslinking in the vinyl emulsion polymer. These may include, for example, allyl methacrylate, diallyl phthalate, 1,4-butylene glycol dimethacrylate, 1,6-hexanedioldiacrylate, and the like. In those embodiments of the invention where the multi-ethylenically-unsaturated monomers are used, it is preferred that they be used as a level of from 0.01 to 5 wt. %, based on the total weight of monomers used to make the total emulsion polymer stage(s).

Preferably, the proportion of solution polymer covalently bound to one emulsion polymer stage may be controlled by selecting, in the monomer mix used to form at least one vinyl emulsion polymer stage, a monomer which is itself soluble (≥10 wt. %) in water, such as a hydroxyalkyl methacrylate or methacrylamide, but whose homopolymer is not appreciably water soluble (≤20 wt. %).

The one or more vinyl emulsion polymer stage(s) of the multistage copolymer of the present invention are formed by conventional emulsion polymerization of the monomers in the presence of the solution polymer stage.

Preferably, in making the one or more vinyl emulsion polymer stage(s) of the multistage polymers, the monomers are fed into the reaction by gradual addition, however a shot polymerization method may be used so long as sufficient chain transfer agent is included to limit molecular weight and encourage multistage copolymer formation. Suitable amounts of chain transfer agent may range, for example, from 2 to 10 wt. %, based on the total weight of monomers used to make each vinyl emulsion polymer stage.

Suitable polyols for use in the aqueous binders of the present invention may include any compound having two to more hydroxyl groups, preferably 3 or more hydroxyl groups, and a molecular weight of 1000 or less. Examples of suitable polyols are alkanolamines, such as diethanolamine and triethanolamine; glycerol; beta-hydroxyalkylamides, such as the reaction product of one mole adipic acid with two moles of triethanolamine; and sugars, including non-reducing sugars such as sucrose and trehalose, reducing sugars such as glucose or fructose, and sugar alcohols such as sorbitol and xylitol.

Preferably, in the aqueous binders of the present invention, the ratio of reactive hydroxyl group equivalents in the polyol to reactive acid functional group equivalents, e.g. carboxyl groups, may range from 0.25:1 to 5.0:1, or, more preferably, 2.0:1 or less, or, preferably, 0.5:1 or more.

Preferably, to optimize crosslinking and reduce curing temperature, the aqueous binders of the present invention may further comprise one or more mineral acid, like sulfuric acid or a phosphorus containing acid, like hypophosphoric or its salts, to adjust the pH of the binder. The pH of the aqueous binder may range 6.5 or less, and is, preferably, 5 or less, or, preferably, from 3.0 to 4.0.

Preferably, to catalyze crosslinking between the multistage copolymer and polyol during high temperature cure, the binders of the present invention may further comprise one or more thermally generated acids in the amount of from 0.5 to 20 wt. % solids based on total binder solids, preferably from 2.0 to 10 wt. %, most preferably from 4.0-8.0 wt. %. Preferred such thermal acids are ammonium salts of inorganic acids; for example, ammonium salts of sulfuric acid, or nitric acid, or hydrochloric acid, or phosphoric acid, or phosphorous acid among others. Such salts may be monobasic, or dibasic, or polybasic depending on the acid. For example, phosphoric acid ($H_3PO_4$) can have three acidic protons. Suitable examples include ammonium sulfate, ammonium persulfate, ammonium chloride, ammonium nitrate, ammonium phosphate, ammonium hydrogen phosphate, ammonium para-toluene sulfonate, and ammonium naphthalene disulfonate. Such species may be added to the formulation. The term "ammonium" includes "alkyl ammonium".

Preferably, to increase the crosslinking density in the cured binder, the binders of the present invention may further comprise one or more water soluble polymeric polyacid having a weight average molecular weight of <100,000, or, less than 50,000, or preferably, less than 25,000, or more preferably, less than 5,000. Such polymeric polyacids may comprise the homopolymers or copolymers of ethylenically unsaturated monomer containing a carboxylic acid or anhydride group or its salt, such as itaconic, maleic and (meth)acrylic acid, preferably (meth)acrylic acid. The water soluble polymeric polyacids may comprise from 70 to 100 wt. % of such acids or anhydrides in polymerized form. The remaining monomers may be other vinyl or acrylic monomers, such as alkyl(meth)acrylates.

Preferably, to increase the crosslinking density in the cured binder, the binders of the present invention may further comprise a low molecular weight polybasic acid, such as citric acid, maleic acid, glutaric acid and polycarboxylic acids having two or three carboxyl groups.

Preferably, to increase the water resistance and/or improve the wet strength in cured binders, the binders of the present invention may further comprise one or more hydrophobic, low acid emulsion polymer, such as one having in copolymerized form less than 5 wt. % carboxylic acid monomer, based on the total weight of monomers used to make the emulsion polymer, preferably, less than 3 wt. %.

The aqueous binders of the present invention may further comprise conventionally used amounts of one or more silane coupling agent, an alkoxysilyl (meth)acrylate, or one that has been hydrolyzed with a weak organic acid; one or more antifoaming agents, or one or more antioxidants.

Uses for the aqueous binders of the present invention may include those for mats, rovings and fibers in mold around materials (e.g. ductwork), sheet molding compounds; and pultrusion applications. For example, fiberglass sheet molding compounds can be molded into complex shapes. Superior mechanical properties and surface appearance, plus excellent electrical insulation make the binder useful for satellite antenna dishes where the mat is used to mold the complex curved surface; class A body panels, such as painted and unpainted automotive componentry, like bumpers, fenders, exterior and interior panels, structural elements, high-temperature underhood parts; high-strength electrical parts, insulating components of switch gear, circuit breakers, and insulators; molded panels for use in personal watercraft; military composite armored vehicle (CAV) technology, bonded-armor panels and liners; body-armor; sheet molding compounds that can be molded into complex shapes; business equipment cabinets; and various structural components.

EXAMPLES

Comparative Example 1

Single Stage High Acid Emulsion Copolymer

An emulsion copolymer having 30 wt. % of an acid functional monomer (acrylic acid) was made, as follows:

To a stirred solution of 36.77 grams deionized (DI) water, 1.56 grams of a 30% (w/w) solution of sodium lauryl ether sulfate (DISPONIL™ FES-993, Cognis Corporation, Cincinnati, Ohio), 1.54 grams of phosphorus-based chain transfer agent (sodium hypophosphite monohydrate, 100% solids) and 0.34 grams of sodium hydroxide solution (50% w/w in $H_2O$) at 85° C. is added 4.09 g of a monomer mix consisting of 29.15 grams acrylic acid (AA), 44.45 grams butyl acrylate (BA) and 23.56 grams methyl methacrylate (MMA) and an initiator solution consisting of 0.41 grams ammonium persulfate (APS, 100% solids) in 1.75 grams DI water. After exotherm peak, the remaining monomer mix and an initiator/soap solution consisting of 0.41 grams APS, 4.88 grams of DISPONIL™ FES-993 (Cognis Corp) and 24 grams DI water were simultaneously added over a period of 2 hours at 85° C.

The batch began to form gel on thermocouple roughly 10 minutes into feeds. After 40 minutes, visible sludge was evident in the solution. After 1 hr of feeds, sludge formation worsens along with a significant increase in batch viscosity and was discarded after an additional 15 minutes due to severe flocculation.

Synthesis Example 1

Multistage Copolymers of Example 1

To a stirred solution of 97.0 g deionized (DI) water at 95° C. was gradually added the indicated monomer mix consisting of 141.0 grams acrylic acid (AA) and 7.4 grams butyl acrylate (BA), a catalyst solution consisting of 3.7 grams ammonium persulfate (APS, 100% solids) and 2.4 grams sodium hydroxide (NaOH) solution (50% w/w in $H_2O$) in 24.7 grams DI water, and a solution consisting of 7.44 grams of a phosphorus-based chain transfer agent (sodium hypophosphite monohydrate, SHP) in 9.5 grams DI Water. After the end of the monomer feeds, the mixture was held at temperature for an additional 30 minutes. Dilution water (200.0 g) is added and the temperature is adjusted to 80° C. A relay reagent allyl glycidyl ether (AGE), 9.45 grams) was added to the mixture, and the mixture was stirred and held for an additional 30 minutes adjusting temperature to 85° C. at the end of the hold. A solution of 1.58 grams APS in 3.03 grams DI water was added and then a monomer emulsion consisting of 133.6 grams DI water, 4.79 grams sodium lauryl sulfate surfactant (SLS), 224.6 grams BA and 121.7 grams MMA was gradually added along with a solution consisting of 2.20 grams APS in 9.38 grams DI water over 2 hrs. Upon completion of the feeds, 73.5 grams DI water was added as the batch cooled to 75° C. A chase promoter solution of $FeSO_4$ heptahydrate and ethylenediaminetetraacetic acid (EDTA) in DI water was added and then a solution of aqueous tert-butyl hydroperoxide (t-BHP) in DI water (70% w/w) and a solution of sodium sulfoxylate formaldehyde (SSF) in DI water were simultaneously added to the reactor over time. The batch was cooled and packed out. The sample was low in viscosity and filtered easily through 45 micron filter. The batch had a particle size of 223 nm and a solids of 46.3%.

Synthesis Examples 2 to 13

Multistage Copolymers of Examples 2 to 13

The multistage copolymers of Examples 2-13 were prepared in the same way as the multi-stage emulsion copolymer in Example 1, with the exception that the batch scale and monomer mixes are as described in Tables 1A and 1B, below.

Comparative Example 2

Emulsion Polymers of Examples 14 to 16

A round-bottom flask equipped with a paddle stirrer, thermocouple, nitrogen inlet, and reflux condenser was charged with 176.0 g deionized water, 6.78 g of DISPONIL™ FES-993 (Cognis Corp), and 5.77 g sodium hypophosphite monohydrate and is then heated to 87° C. At 87° C., 1.47 g of sodium hydroxide 50% w/w in $H_2O$ is added. Then 4.13% of a monomer emulsion consisting of 119.4 g DI water, 21.23 g DISPONIL™ FES-993, 64.0 g AA, 228.2 g BA, 49.0 g Sty and 85.5 g AN (indicated in Table 2, below) was then added to flask, followed by the addition of 1.75 g ammonium persulfate dissolved in 7.9 g DI water. The reaction was then held for 10 minutes for a 3-5° C. exotherm. After achieving peak exotherm, the remaining monomer emulsion was gradually added over 2 hrs in addition to a separate solution of 1.75 g ammonium persulfate dissolved in 34.4 g DI water while maintaining temperature at 85-87° C. After this addition was complete, the reaction mixture was held at 85° C. for 10 minutes and then cooled to 75° C. A chase promoter solution of ethylenediamine tetraacetate (VERSENE™, Dow Chemical Co., Midland, Mich.) and ferrous sulfate heptahydrate was then added to the reaction mixture. A solution of t-butyl hydroperoxide initiator (70% wt.) in DI water and a separate solution of sodium bisulfite dissolved in deionized water was gradually added to reaction mixture over time. The reaction mixture was then cooled and filtered through 45 micron screen sieve. The resulting latex had a solids content of roughly 46 wt. %.

In Example 15, the process used in Example 14 was repeated with a different monomer composition (as indicated in Table 2, below).

In Example 16, the process used in Example 14 was repeated, except that the batch size was increased (by 3.85×) and the monomer composition was changed (as indicated in Table 2, below).

Comparative Example 17

Single Stage Emulsion Copolymer (60.2 BA/23.8 Styrene/15 AA/1 ALMA)

A 5-gallon stainless steel reactor equipped with a stirrer, thermocouple, nitrogen inlet, and reflux condenser was charged with 2272.3 g of DI water and then heated to 88° C. A monomer emulsion was prepared according to the recipe shown in Table 2, below. At temperature, 215.1 g of sodium hypophosphite dissolved in 56.4 g of DI water was added to the reactor. A mixture of 113.92 g of DISPONIL FES-993 (Cognis Corp.) dissolved in 105.0 grams of deionized water was added to the reactor. A mixture of 12.33 g of sodium hydroxide 50% w/w in $H_2O$ was diluted in 101.13 g of deionized water was then added to the reactor along with 4.1% of the monomer emulsion. Then 29.48 grams of ammonium persulfate dissolved in 133.04 grams deionized water was added to the flask. After reaching peak exotherm, the monomer emulsion was then gradually added over 2 hrs along with a separate solution of 29.48 g of ammonium persulfate dissolved in 628.43 g of deionized water, while maintaining the temperature of 86° C. After this addition was complete, a solution of 171.12 g of sodium hydroxide dissolved in 1903.01 g of deionized water was gradually added to reactor over 20 minutes. After this addition was complete a solution of 8.7 g of aqueous 1 wt. % tetrasodium ethylendiaminetetraacetate and 57.33 g of aqueous 0.15% ferrous sulfate heptahydrate was added to reaction mixture. Residual monomers were reduced by the simultaneous gradual addition of the following solutions twice: 31.62 g of tert-butyl-hydroperoxide (70% w/w in $H_2O$) diluted in 124.35 g of deionized water and a separate solution of 21.1 g of sodium bisulfite dissolved in 250.7 g of deionized water. The reaction mixture was cooled and a mixture of 524.8 g of triethanolamine and 305.5 g of sodium hypophosphite dissolved in 184.2 g of DI water was gradually added over 15 minutes to reactor. A biocide was added followed by 9.01 g of FOAMASTER™ RHO petroleum derivative defoamer (100 wt. % actives, BASF, Leverkusen DE) dissolved in 16.71 g of DI water. The latex had a solids content of roughly 46.0 wt. %.

Comparative Example 18

Single Stage Emulsion Copolymer (30.9 BA/54.1 Styrene/15 AA)

A 5-gallon stainless steel reactor equipped with a stirrer, thermocouple, nitrogen inlet, and reflux condenser was charged with 2328.17 grams of deionized water and then heated to 88° C. A monomer emulsion was prepared according to the recipe shown in Table 2, below. At temperature, 216.51 g of sodium hypophosphite dissolved in 153.7 g of DI water was added to the reactor. A mixture of 114.49 g of DISPONIL™ FES-993 (Cognis Corp.) dissolved in 105.48 g of DI water was added to the reactor. A mixture of 12.39 g of sodium hydroxide (50% w/w in $H_2O$) was diluted in 101.67 g of DI water and was added to the reactor. A 395.60 gram portion of the monomer emulsion was then added followed by a solution of 29.63 g of ammonium persulfate dissolved in 133.70 g DI water. After reaching peak exotherm, the remaining monomer emulsion was then gradually added over 2 hrs along with a separate solution of 29.63 g of ammonium persulfate dissolved in 631.58 g of deionized water, while maintaining temperature of 86° C. After this addition was complete, a solution of 171.97 g of sodium hydroxide dissolved in 1912.52 g of DI water was gradually added over 20 min to the reactor. After this addition was complete a solution of 8.8 g of a 1% w/w aqueous tetrasodium ethylendiaminetetraacetate and 57.6 g of an aqueous 0.15% ferrous sulfate heptahydrate was added to reaction mixture. Residual monomers were reduced by the simultaneous gradual addition of the following solutions: 63.56 g of tert-butyl-hydroperoxide (70%) diluted in 249.94 g of deionized water and a separate solution of 42.33 g of sodium bisulfite dissolved in 503.91 g of deionized water. The reaction mixture was cooled and a mixture of 527.43 g of triethanolamine and 307.01 g of sodium hypophosphite dissolved in 185.16 g of deionized water was gradually added to reactor. A biocide was added followed by 13.51 g of FOAMASTER™ RHO defoamer (100% actives) dissolved in 25.07 g of deionized water. The resulting emulsion copolymer had a solids content of roughly 46.0%.

Comparative Example 19

Single Stage Emulsion Copolymer (30.9 BA/54.1 Styrene/15 AA)

A 5-gallon stainless steel reactor equipped with a stirrer, thermocouple, nitrogen inlet, and reflux condenser was charged with 2328.17 g of DI water and then heated to 88° C. A monomer emulsion was prepared according to the recipe shown in Table 2, below. At temperature, 216.51 g of sodium hypophosphite dissolved in 153.7 g of deionized water was added to the reactor. A mixture of 114.49 g of DISPONIL™ FES-993 surfactant dissolved in 105.48 g of deionized water was added to the reactor. A mixture of 12.39 g of sodium hydroxide was dissolved in 101.67 g of deionized water was added to the reactor. A 395.60 gram portion of the monomer emulsion was then added, followed by the addition of 29.63 g of ammonium persulfate dissolved in 133.70 g DI water. After reaching peak exotherm, the monomer emulsion is then gradually added over 2 hrs along with a separate solution of 29.63 g of ammonium persulfate dissolved in 631.58 g of deionized water, while maintaining temperature of 86° C. After this addition was complete, a solution of 171.97 g of sodium hydroxide dissolved in 1912.52 g of deionized water was gradually added over 20 minutes reactor. After this addition was complete a solution of 8.8 g of aqueous 1% w/w tetrasodium ethylendiaminetetraacetate and 57.6 g of aqueous 0.15% ferrous sulfate heptahydrate was added to reaction mixture. Residual monomers were reduced by the simultaneous gradual addition of the following solutions: 63.56 g of tert-butyl-hydroperoxide (70% w/w in $H_2O$) diluted in 249.94 g of deionized water and a separate solution of 42.33 g of sodium bisulfite dissolved in 503.91 g of deionized water. The reaction mixture was cooled and a mixture of 527.43 g of triethanolamine and 307.01 g of sodium hypophosphite dissolved in 185.16 g of deionized water was gradually added to reactor over a period of 15 min. After this addition was complete 440.4 g of ammonium sulfate dissolved in 440.4 g of deionized water was gradually added to reactor over a period of 15 min. A biocide was added followed by 9.05 g of FOAMASTER™ RHO (BASF) dissolved in 16.07 g of deionized water. The resulting emulsion copolymer had a solids content of roughly 46.0%.

Tables 1A (Solution Polymer Stage) and 1B (Emulsion Polymer Stage) in Examples 1-13: Polymerization Recipes For Multistage Copolymers (Weights in Grams)

TABLE 1A

Aqueous Solution Polymer with Relay Reagent

| Example | DI Water | SHP | IA[1] | AA | BA | DI Water | AGE[2] |
|---|---|---|---|---|---|---|---|
| 1 | 97.0 | 7.4 | 0 | 141.0 | 7.4 | 200.0 | 9.45 |
| 2 | 155.0 | 11.6 | 0 | 219.3 | 11.6 | 220.0 | 14.8 |
| 3 | 165.0 | 12.8 | 0 | 241.3 | 12.7 | 154.0 | 16.2 |
| 4 | 155.0 | 11.6 | 0 | 219.3 | 11.6 | 220.0 | 14.8 |
| 5 | 170.0 | 12.8 | 0 | 241.3 | 12.7 | 155.0 | 16.2 |
| 6 | 100.0 | 19.0 | 0 | 300.4 | 53.0 | 691.5 | 25.0 |
| 7 | 100.0 | 19.0 | 0 | 300.4 | 53.0 | 691.5 | 25.0 |
| 8 | 100.0 | 19.0 | 0 | 300.4 | 53.0 | 691.5 | 25.0 |
| 9 | 100.0 | 19.0 | 0 | 374.7 | 66.1 | 759.0 | 31.3 |
| 10 | 59.4 | 8.4 | 0 | 89.1 | 9.9 | 189.1 | 9.3 |
| 11 | 60.6 | 4.7 | 0 | 89.5 | 4.7 | 178.5 | 6.0 |
| 12 | 60.6 | 4.7 | 0 | 89.5 | 4.7 | 178.5 | 6.0 |
| 13 | 120.3 | 0.5 | 75.4 | 32.3 | 0.0 | 153.0 | 5.7 |

[1]Itaconic acid;
[2]Relay reagent (allyl glycidyl ether).

TABLE 1B

Aqueous Emulsion Polymer Stage

| Example | DI Water | AN | BA | Sty | MMA | DI Water |
|---|---|---|---|---|---|---|
| 1 | 133.6 | 0 | 224.6 | 0 | 121.7 | 74.2 |
| 2 | 133.6 | 0 | 224.6 | 0 | 121.7 | 74.3 |
| 3 | 65.3 | 0 | 109.8 | 0 | 59.5 | 38.4 |
| 4 | 133.6 | 0 | 103.9 | 0 | 242.4 | 74.3 |
| 5 | 65.3 | 0 | 50.8 | 0 | 118.5 | 38.4 |
| 6 | 441.4 | 300.4 | 767.6 | 77.5 | 0 | 268.6 |
| 7 | 441.4 | 450.0 | 748.5 | 0 | 0 | 268.6 |

TABLE 1B-continued

Aqueous Emulsion Polymer Stage

| Example | DI Water | AN | BA | Sty | MMA | DI Water |
|---|---|---|---|---|---|---|
| 8 | 441.4 | 450.0 | 532.9 | 215.5 | 0 | 268.6 |
| 9 | 441.4 | 300.4 | 757.6 | 0 | 0 | 268.6 |
| 10 | 130.9 | 0 | 13.6 | 0 | 325.7 | 76.8 |
| 11 | 133.6 | 0 | 224.6 | 0 | 121.7 | 74.3 |
| 12 | 133.6 | 0 | 153.9 | 0 | 192.4 | 74.3 |
| 13 | 152.7 | 0 | 15.8 | 0 | 380.0 | 84.9 |

TABLE 2

Comparative Single Stage Emulsion Copolymers (weights in grams)

| Example | DI Water | AA | BA | Sty* | AN* | ALMA |
|---|---|---|---|---|---|---|
| 14 | 119.4 | 64.0 | 228.2 | 49.0 | 85.5 | 0 |
| 15 | 119.4 | 64.0 | 148.9 | 128.0 | 85.5 | 0 |
| 16 | 459.7 | 358.5 | 1093.4 | 322.6 | 0 | 17.9 |
| 17 | 2005.6 | 1075.3 | 4315.6 | 1706.2 | 0 | 71.69 |
| 18 | 2015.7 | 1080.7 | 2226.2 | 3897.7 | 0 | 0 |
| 19 | 2015.7 | 1440.9 | 1689.5 | 4074.2 | 0 | 0 |

*AN = Acrylonitrile; Sty = Styrene

Table 3, below, depicts binder formulations made from the copolymers of Examples 1-16. Unless otherwise indicated, the binder formulations in Table 3, above, were prepared by mixing on a CAFRAMO™ type RZR50 stirrer (Caframo Ltd., Wiarton, Ontario, Calif.) equipped with stirring blade and agitated to achieve a stable vortex for 15 minutes at room temperature conditions. The formulations for the polymers of Comparative Examples 17-19 are listed in Table 4, below as Examples 35-38. Formulation Examples 35-37 are described above in the synthesis of emulsion copolymers in Comparative Examples 17-19, with polyol and any catalyst included. Comparative Example 38 is a blend made by blending an all-acrylic self-crosslinking emulsion polymer containing in copolymerized form n-methylol acrylamide, and an aqueous polyacrylic acid polymer having 6% of a hyphophosphite residue in the polymer backbone, based on the total weight of monomers, both manufactured by Rohm and Haas Company, Philadelphia, Pa. (Dow Chemical Company)], at a ratio of 70/30 on a dry weight basis.

TABLE 3

Binder Formulations

| Example | g. Polymer | g. Polyol | g. Accel. | g. Latent Acid | g. Water |
|---|---|---|---|---|---|
| 19 | 151.2 Ex. 1 | 8.9 triethanolamine | 3.7 SHP | 0.0 AS | 185.7 |
| 20 | 150.5 Ex. 2 | 8.9 triethanolamine | 3.7 SHP | 0.0 AS | 186.3 |
| 21 | 177.5 Ex. 3 | 10.4 triethanolamine | 4.4 SHP | 0.0 AS | 217.1 |
| 22 | 145.8 Ex. 4 | 8.9 triethanolamine | 3.7 SHP | 0.0 AS | 191.0 |
| 23 | 192.7 Ex. 5 | 11.4 triethanolamine | 4.8 SHP | 0.0 AS | 240.4 |
| 24 | 378.8 Ex. 6 | 22.2 triethanolamine | 9.3 SHP | 8.8 AS | 419.7 |
| 25 | 378.0 Ex. 7 | 16.6 triethanolamine | 7.0 SHP | 8.8 AS | 402.5 |
| 26 | 367.2 Ex. 8 | 21.6 triethanolamine | 9.1 SHP | 8.5 AS | 408.5 |
| 27 | 378.0 Ex. 9 | 22.2 triethanolamine | 9.3 SHP | 8.8 AS | 420.5 |
| 28 | 374.7 Ex. 10 | 22.2 triethanolamine | 9.3 SHP | 8.8 AS | 423.8 |
| 29 | 175.0 Ex. 11 | 10.1 triethanolamine | 4.3 SHP | 0.0 AS | 209.9 |
| 30 | 172.8 Ex. 12 | 10.1 triethanolamine | 4.3 SHP | 0.0 AS | 212.2 |
| 31 | 348.0 Ex. 13 | 21.9 triethanolamine | 9.1 SHP | 0.0 AS | 526.6 |
| 32* | 373.9 Ex. 14 | 16.6 triethanolamine | 7.0 SHP | 8.8 AS | 406.5 |
| 33* | 377.2 Ex. 15 | 16.6 triethanolamine | 7.0 SHP | 8.8 AS | 403.3 |
| 34* | 378.0 Ex. 16 | 22.2 triethanolamine | 9.3 SHP | 8.8 AS | 420.5 |

*Comparative Example

The aqueous formulations were tested, as follows:

Handsheet Preparation Procedure:

Glass fiber nonwoven handsheets were prepared with 1.90 cm (¾ inch) K Fiber wet chop (manufactured by Owens Corning, Toledo, Ohio), using approximately 7.6 grams of glass fiber per sheet or 8.8 Kg/100 m² (1.8 lb/100 ft²). The glass fiber was dispersed in water using Nalco 7768 polyacrylamide viscosity modifier (Nalco Company, Naperville, Ill.), and Nalco 01 NM149 ethoxylated amine dispersant (Nalco Company, Naperville, Ill.). Handsheets were formed in a Williams standard pulp testing apparatus (Williams Apparatus Company, Watertown, N.Y.), handsheet mold. The wet sheets were transferred to a vacuum station and de-watered. The aqueous formulations described in Table 3, above were prepared and then applied to a de-watered sheet and the excess was vacuumed off. The sheets were dried/cured in a forced air oven for 3 minutes at 200° C.

Mechanical Property Testing of Nonwoven Mats:

i) Elmendorf Tear Strength Testing:

Elmendorf tear strength was determined on cut 6.4 cm by 7.6 cm (2.5 in by 3 in) samples of dried/cured handsheet. A single ply sample was placed in a Thwing-Albert tear tester (Thwing-Albert Instrument Company, West Berlin, N.J.) with a 1600 g tear arm. The sample was notched with a 1.9 cm (0.75 inch) cut and the arm was released. The tear strength was recorded in grams (grams-force).

ii) Tensile Strength Testing:

The glass fiber nonwoven handsheets were cut into 2.54 cm (1 in) by 12.7 cm (5 in) strips for tensile testing.

a. Dry and Hot-Wet Tensile Strength (HW TS):

testing was performed on seven strips from each sample using a Thwing-Albert Intellect 500 tensile tester (Thwing-Albert Instrument Company, West Berlin, N.J.) with a 45 N (200 lb.) load cell set at a 2.54 cm/min (1 in/min). crosshead speed, 20% sensitivity, and a 7.62 cm (3 in) gap. Dry Tensile testing was performed on the prepared strips. Hot-Wet tensile strength testing was performed after soaking strips for 10 minutes in 85° C. water. After the soaking period, the strips were patted dry with paper towels and immediately pulled apart at a crosshead speed of 2.54 cm/min (1 in/min) with a 7.62 cm (3 in) gap. Hot-Dry Tensile Strength testing was performed on the prepared strips using an Instron 4201 tensile tester (Instron, Norwood, Mass.) equipped with a 1 kN load cell and an oven chamber encasing the jaws with a temperature range capability of −73° C. to 204° C. (−100 to 400° F.). The oven chamber of the tensile tester was pre-heated to 150° C. (302° F.) prior to testing. Once pre-heated, the strips were placed in the jaws and the oven chamber was closed and equilibrated back to 150° C. (302° F.). The samples were then pulled apart at a crosshead speed of 2.54 cm/min (1 in/min) with a 7.62 cm (3 in) gap.

b. Styrene Resistance:

Performed after soaking strips for 30 minutes in styrene monomer at room temperature. After the soaking period, the strips were patted dry with paper towels and immediately pulled apart at a crosshead speed of 2.54 cm/min (1 in/min) with a 7.62 cm (3 in) gap.

All tensile strengths are recorded in Newtons.

The mechanical properties found in testing are presented in Table 4, below.

TABLE 4

Mechanical Strength Results

| Example | RT Tensile (N) | Hot-Wet Tensile (N) | Hot-Dry Tensile (N) | Styrene Res.N) |
|---|---|---|---|---|
| 19 | 112.5 | 62.7 | 61.8 | 120.5 |
| 20 | 112.1 | 77.8 | 87.2 | 160.6 |
| 21 | 121.0 | 85.0 | 111.7 | 208.2 |
| 22 | 133.4 | 99.6 | 103.2 | 214.0 |
| 23 | 142.3 | 86.7 | 122.3 | 214.0 |
| 24 | 168.6 | 106.8 | 78.3 | 141.9 |
| 25 | 222.0 | 134.3 | 83.6 | 172.1 |
| 26 | 291.8 | 165.5 | 76.1 | 157.5 |
| 27 | 201.1 | 117.0 | 89.9 | 180.2 |
| 28 | 250.9 | 189.0 | 103.6 | 129.0 |
| 29 | 105.0 | 55.6 | 44.5 | 123.7 |
| 30 | 142.8 | 89.0 | 40.9 | 144.6 |
| 31 | 173.0 | 122.3 | 82.7 | 155.2 |
| 32* | 131.2 | 81.0 | 86.7 | 93.0 |
| 33* | 176.6 | 110.8 | 66.7 | 76.5 |
| 34* | 202.4 | 169.5 | 64.5 | 86.3 |
| 35* | 153.0 | 81.8 | 73.0 | 90.7 |
| 36* | 238.0 | 196.6 | 71.6 | 53.8 |
| 37* | 213.1 | 162.8 | 65.4 | 80.1 |
| 38* | 105.0 | 78.7 | 40.5 | 64.1 |

*Comparative Example

As shown in Table 4, above, the solvent resistance in all of the inventive Examples 19-31 as shown by styrene resistance dramatically outperformed all formulations of carboxyl group containing single stage emulsion copolymers in Comparative Examples 32-38, regardless of acid content. All other properties were in general at least as good as in the Comparative Examples. As shown in Examples 24-27, an advantageous multistage copolymer can be made when using acrylonitrile as a vinyl monomer. As shown in Example 28, an advantageous multistage copolymer can be made using a phosphorus containing chain transfer agent. As shown in Example 31, an advantageous multistage copolymer can be made when using itaconic acid as an acid functional monomer.

We claim:

1. An aqueous binder composition comprising a multistage copolymer in two or more stages having as the outermost stage a polymerized acid functional aqueous solution polymer and as the one or more remaining stages a vinyl emulsion polymer wherein the emulsion polymer stage(s) in the multistage copolymer comprise 5 wt. % or less of hydrophilic monomer, based on the total weight of monomers used to make the emulsion polymer stage(s), and one or more polyol.

2. The aqueous binder composition as claimed in claim 1, wherein the aqueous solution polymer comprises a total of from 70 to 100 wt. % of hydrophilic monomers that contain a hydrophilic functional group, in copolymerized form, based on the total weight of monomers used to make the solution polymer, such that the aqueous solution polymer comprises from 30 to 100 wt. % of acid, carboxylic acid or carboxylate functional hydrophilic monomers, in (co)polymerized form, based on the total weight of monomers used to make the solution polymer.

3. The aqueous binder composition as claimed in claim 2, wherein the acid functional hydrophilic monomers used to make the solution polymer are acrylic acid, methacrylic acid, itaconic acid, or their salts.

4. The aqueous binder composition as claimed in claim 1, wherein the ratio of hydroxyl group equivalents in the polyol to acid functional group equivalents, in the multistage copolymer ranges from 0.125:1 to 10.0:1.

5. The aqueous binder composition as claimed in claim 1, wherein the weight ratio of the solution polymer stage(s) to the total emulsion polymer stage(s) ranges from 1:19 to 3:1.

6. The aqueous binder composition as claimed in claim 1, wherein the vinyl emulsion polymer stage(s) of the multistage copolymer comprise from 0.1 to 100 wt. % of acrylonitrile, in copolymerized form, based on the total weight of monomers used to make the emulsion polymer stage(s) of the multistage copolymer.

7. The aqueous binder composition as claimed in claim 1, wherein the polyol has a molecular weight of 1000 or less.

8. The aqueous binder composition as claimed in claim 1, further comprising a catalyst.

9. A method of using an aqueous binder composition comprising pultruding two or more non-woven fibers or a fiber roving with an aqueous binder composition, and drying, wherein the aqueous binder composition comprises one or more polyol and a multistage copolymer in two or more stages having as the outermost stage a polymerized acid functional aqueous solution polymer and as the one or more remaining stage(s) a vinyl emulsion polymer, wherein the emulsion polymer stage(s) in the multistage copolymer comprises 5 wt. % or less of hydrophilic monomer, based on the total weight of monomers used to make the emulsion polymer stage(s).

10. A product comprising a fiber article treated with an aqueous binder composition, wherein the aqueous binder composition comprises one or more polyol and a multistage copolymer in two or more stages having as the outermost stage a polymerized acid functional aqueous solution polymer and as the one or more remaining stage(s) a vinyl emulsion polymer, wherein the emulsion polymer stage(s) in the multistage copolymer comprises 5 wt. % or less of hydrophilic monomer, based on the total weight of monomers used to make the emulsion polymer stage(s).

* * * * *